United States Patent Office 3,634,361
Patented Jan. 11, 1972

---

3,634,361
POLYISOCYANATE COMPOSITIONS
Andrew Shultz, Williamsville, and Melvin Kaplan, Tonawanda, N.Y., assignors to Allied Chemical Corporation, New York, N.Y.
No Drawing. Original application Oct. 10, 1966, Ser. No. 585,268, now Patent No. 3,455,836, dated July 15, 1969. Divided and this application Feb. 27, 1969, Ser. No. 816,862
Int. Cl. C08g 22/00, 22/18
U.S. Cl. 260—77.5 AT    4 Claims

ABSTRACT OF THE DISCLOSURE

A urethane polymer obtained by reacting an organic polyisocyanate composition having a viscosity in the range of 35 to 1,000 cps. at room temperature and comprising about 25 to about 80 percent by weight of 4,4'-methylene bis-(phenylisocyanate) and about 75 to about 20 percent by weight of a distillation residue obtained by distilling tolylene diisocyanate from a mixture thereof with by-products obtained in the phosgenation of the corresponding diamine to produce said tolylene diisocyanate with a polyol having terminal hydroxyl groups.

---

This is a division of application Ser. No. 585,268, filed Oct. 10, 1966, now U.S. Pat. 3,455,836. The invention relates to polyisocyanate compositions and more particularly to liquid organic polyisocyanate compositions especially useful for the manufacture of rigid polyurethanes.

Diisocyanates as a group are useful in combination with high molecular weight polyhydroxy compounds in the manufacture of resilient and rigid urethane foams, lacquers, protective coatings, adhesives, fibers, films, moulded articles and the like. Athough excellent products of this sort can be made from 4,4'-methylene bis(phenylisocyanate), wide acceptance of this product has been hampered by the operating inconveniences arising from handling the solid material and from its instability during storage in liquid form.

Even when stored in air-tight containers, the diisocyanates are unstable and tend to polymerize soon after they are prepared. Such polymerization is highly undesirable since it would give rise to by-products when the isocyanate is reacted with organic compounds containing active hydrogen atoms.

The viscosity of diisocyanates also often changes upon storage. In some cases, this change is only several centipoises while in other cases, the original fluid clear composition becomes quite viscous and often contains considerable solid material.

For many uses, 4,4'-methylene bis(phenylisocyanate) must be handled in a foam machine which involves feeding liquid into a central mixer. Unless a relatively low viscosity can be obtained, it is difficult to pump and meter the 4,4'-methylene bis(phenylisocyanate). In order to lower the viscosity, it is known to heat the 4,4'-methylene bis(phenylisocyanate) but this often results in polymerization and other undesirable effects.

There is therefore a continued need for diisocyanates such as 4,4'-methylene bis(phenylisocyanate) which are free from such problems of viscosity control and instability during storage.

It is therefore an object of the present invention to produce an organic polyisocyanate comprosition possessing a viscosity within the range of 35 to 1,000 cps. at room temperature.

It is another object of the present invention to produce a stable composition comprising organic polyisocyanate and 4,4'-methylene bis(phenylisocyanate) which will remain in liquid form indefinitely at room temperature.

It is a further object of the present invention to produce an organic polyisocyanate suitable for the manufacture of rigid polyurethanes.

We have discovered that liquid compositions comprising 4,4'-methylene bis(phenylisocyanate) which remain indefinitely in liquid form without any change at room temperature and which, in addition, yield excellent urethane polymer foams in combination with polyoxyalkylenes having terminal hydroxyl groups, are obtained by admixing 25 to 80 percent by weight 4,4'-methylene bis (phenylisocyanate) and 75 to 20 percent by weight of a distillation residue obtained by distilling an organic polyisocyanate from a mixture thereof with by-products obtained in the phosgenation of the corresponding polyamines to produce said organic polyisocyanate. In particular we have discovered that liquid compositions comprising 4,4'-methylene bis(phenylisocyanate), which remain indefinitely in liquid form at room temperature and which yield excellent products in combination with high molecular weight polyhydroxy compounds are obtained by admixing 25 to 80 percent by weight, preferably 50 to 75 percent by weight, of 4,4'-methylene bis(phenylisocyanate) and 75 to 20 percent by weight, preferably about 25 to 50 percent by weight, of a distillation residue obtained by distilling tolylene diisocyanates from a mixture thereof with by-products obtained in the phosgenation of the corresponding toluenediamines to produce said tolylene diisocyanates, said distillation residue having a viscosity in the range of about 300 to about 10,000 cps. at room temperature. The liquid compositions or our invention are characterized in having surprisingly low viscosities, in the range of about 35 to 1000 cps, at about room temperature, since compositions having such a low viscosity range are not expected from the mere admixing of a highly viscous residue having a viscosity in the range of about 300 to about 10,000 cps. and 4,4'-methylene bis(phenylisocyanate) which is normally solid. Considering the viscosity range, generally about 300 to about 10,000 cps. at room temperature, of the residues used in our invention and the fact that 4,4'- methylene bis(phenylisocyanate) is solid at about room temperature, we were surprised to observe that admixture of the two products results in a liquid composition having a viscosity range considerably below that of even the liquid component of the composition particularly in view of the chemical similarity of the components of our compositions which would lead one to believe that admixture of the two components should result, in view of the expected absence of any chemical interactions between the individual components of the composition, in a product having a viscosity intermediate between the viscosities of the individual components thereof.

The new compositions of our invention remain in the liquid state, at room temperature, indefinitely. They can be shipped in liquid form, without a need for heated or insulated trucks or railroad cars. As liquids, they can be metered, blended, poured and otherwise handled like any other non-viscous liquids. The new stable liquid compositions of our invention are particularly suitable for use in continuous foam-making machines where the presence of viscous materials or the occurrence of solid particles interfere with the proper continuous operation of the machine.

An additional advantage of the method of the present invention is that it makes possible optimum use of the major components of a crude mixture produced when one phosgenates toluenediamines in that it employs a distillation residue possessing a relatively high viscosity, i.e., up to about 10,000 cps. at room temperature. Such a viscous residue is produced after a large amount of toluene diisocyanate has been distilled and stripped off in a pure state. This method allows the production of large amounts of the distilled product while at the same time employing the viscous residue to produce polyisocyanates of low viscosity.

The new compositions of our invention can be readily prepared by simply blending molten 4,4'-methylene bis (phenylisocyanate) and the viscous tolylene diisocyanate residue in any order using conventional blending and metering equipment. Alternatively, 4,4'-methylene bis (phenylisocyanate) can be added to the liquid residue under conditions to ensure complete diffusion of the solid in the liquid tolylene diisocyanate residue.

The tolylene diisocyanate residues employed in our invention may be prepared by phosgenating a toluenediamine mixture, for example as obtained by reduction of the dinitration product of toluene, dissolved in a neutral solvent such as O-dichlorobenzene, at an initial temperature of about 0 to 5° C. and a final temperature of about 140–160° C. The phosgenation mixture, after degassing, is fractionated to remove the solvent and enough of the pure diisocyanate so as to produce a residue having a viscosity in the range of about 300 to about 10,000 cps. at about room temperature, useful in the preparation of the novel compositions of our invention.

The 4,4'-methylene bis(phenylisocyanate) component of our novel compositions can be prepared by phosgenation of 4,4'-methylenedianiline essentially as described in U.S. Pat. 3,163,666.

The liquid compositions of our invention may be readily converted to useful polymeric materials such as rubber, rubber-like materials, adhesives, coating agents, synthetic fibers, films, moulded plastic articles, building panels and the like by combination with active-hydrogen containing materials, such as polyethers, polyester, polyols, polyamides and the like. Thus, they may be used to prepare cellular polyurethane foams such as those formed by using procedures described in U.S. Pat. Nos. 3,016,364, 3,012,-989, 3,130,175 and 3,134,741, and to prepare elastomers as those formed by using procedures described in U.S. Pat. 2,890,198.

Fillers, coloring materials, fire-retardant agents, plasticizers or other materials known from the prior art to be added in the manufacture of foamed polyurethanes, preferably not reactive with isocyanates, may be added to the mixture at an appropriate stage.

The preparation of the products of our invention and their use in the manufacture of urethane foamed polymers is further illustrated by the following representative examples.

EXAMPLE 1

For the preparation of a tolylene diisocyanate distillation residue, useful in the preparation of the liquid compositions of our invention, a solution of commercial toluenediamines in orthodichlorobenzene, corresponding to a concentration of 10 percent by weight of toluenediamines, is added to a solution of phosgene in orthodichlorobenzene corresponding to a phosgene concentration of 25 percent by weight and to a molar ratio of phosgene to toluene of about 4 to 1, at such a rate that the reaction temperature does not exceed 20° C. The reaction mixture is then heated in a period of 3¼ to 4 hrs. to a final temperature of about 173° C. while phosgene is continuously added until the evolution of hydrogen chloride ceases. The phosgenation mixture is then degassed by a rapid stream of dry nitrogen and the solvent is removed by vacuum distillation at a pressure of about 40 mm. Hg and a temperature of about 120–140° C.

A portion, about 2500 g. of a degassed and solvent-free phosgenation residue prepared as described above, is subjected to fractional distillation at about 107° C. and about 4 mm. Hg pressure and a fraction of pure tolylene diisocyanate about 1000 g. is collected. The residue, about 1430 g. has a viscosity of about 710 cps. at room temperature and is used without further treatment for the preparation of the liquid compositions of our invention.

EXAMPLE 2

A mixture of about 200 g. of the distillation residue prepared according to Example 1 and 600 g. crude 4,4'-methylene bis(phenylisocyanate) is stirred and heated until completely liquid and homogenous, at about 35° C. On cooling to room temperature, a homogeneous liquid composition is obtained, having a viscosity of about 73 cps. at room temperature, which retains its fluidity and homogeneity after storage for over three months at room temperature.

EXAMPLE 3

In a manner identical with that described in Example 2, 200 g. of the distillation residue prepared according to Example 1 and 400 g. 4,4' - methylene bis(phenylisocyanate) yield a homogenous liquid composition having a viscosity of about 78 cps. at room temperature, which retains its fluidity and homogeneity characteristicistics after storage for three months at room temperature.

EXAMPLE 4

A 50–50 mixture of the distillation residue prepared according to Example 1 and of 4,4'-methylene bis(phenylisocyanate) is prepared using 300 g. of each of the two components. The product composition obtained is a homogeneous liquid at room temperature, and has a viscosity of about 106 cps. It retains its fluidity and homogeneity characteristics after storage at room temperature for about 3 months.

EXAMPLE 5

A premix is prepared by blending 120 parts by weight of a polyether polyol (Solvay GS-460, a polyoxypropylene adduct of sucrose and glycerine, having a hydroxyl number of about 460), 10 parts by weight of a polyether polyamine (NIAX–LA–700, a polyoxypropylene adduct of diethylenetriamine, having a hydroxy number of about 700), 1.2 parts by weight of a silicone surfactant, 0.5 part by weight dimethylethanolamine and 50 parts by weight monofluorotrichloromethane blowing agent. Rigid foam samples are prepared by mixing for about 30 to about 40 seconds about 160 parts by weight of the premix and about 130 parts by weight of each of three liquid compositions prepared according to Examples 2, 3, and 4 above. The foam samples have excellent strength and dimensional stability properties as shown in Table 1.

TABLE 1.—FOAM PROPERTIES

| Source of isocyanate composition | Ex. 2 | Ex. 3 | Ex. 4 |
|---|---|---|---|
| Tack free time, in seconds | 40 | 55 | 40 |
| Density, lb./cu. ft | 1.7 | 1.7 | 1.8 |
| Porosity, as percent open cells | 6.9 | 6.9 | 2.3 |
| Compression load at yield point, p.s.i. | 20 | 17 | 18 |
| Compression load at 10% yield deflection, p.s.i. | 22 | 22 | 22 |
| Dimensional stability, percent | 0.12 | 0.21 | 0.4 |
| Volume change: | | | |
| After 24 hrs., 70° C., 60% R.H | | | |
| After 24 hrs., 110° C., 60% R.H | 1.2 | 1.6 | 0.8 |
| After 24 hrs., −30° C., 60% R.H | 0.1 | 0.03 | 0.03 |
| After 24 hrs., 70° C., 100% R.H | 4.2 | 9.0 | 6.0 |
| After 72 hrs., 100° F., 100% R.H | 0.3 | 0.1 | 0.1 |

Wherein, in the above specification, 4,4'-methylene bis (phenylisocyanate) is employed, it is to be understood that mixtures of polyisocyanates derived from and or containing 4,4'-methylene bis(phenylisocyanate) such as the polyalkylene polyaryl polyisocyanates disclosed in U.S. Pat. 2,683,730 may be substituted therefor without in any way departing from the scope or spirit of our invention. The invention will therefore be limited only by the following claims.

We claim:

1. A urethane polymer obtained by reacting an organic polyisocyanate composition having a viscosity in the range of 35 to 1,000 cps. at room temperature and comprising about 25 to about 80 percent by weight of 4,4'-methylene-bis-(phenylisocyanate) and about 75 to about 20 percent by weight of a distillation residue obtained by distilling tolylene diisocyanate from a mixture thereof with by-products obtained in the phosgenation of the corresponding diamine to produce said tolylene diisocyanate with a polyol having terminal hydroxyl groups.

2. A urethane polymer as defined in claim 1 wherein said polyisocyanate comprises from about 50 to about 75 percent by weight of 4,4'-methylene-bis-(phenylisocyanate) and from about 25 to about 50 percent by weight of the distillation residue.

3. A urethane polymer as defined in claim 2, wherein the polyol comprises a mixture of a polyoxypropylene adduct of sucrose and glycerine having a hydroxyl number of about 460 and a polyoxypropylene adduct of diethylenetriamine having a hydroxyl number of about 700.

4. A urethane polymer as defined in claim 3 wherein the organic polyisocyanate composition has a viscosity in the range of about 73 to about 106 cps. at room temperature.

References Cited

UNITED STATES PATENTS

| | | | |
|---|---|---|---|
| 3,359,295 | 12/1967 | Schultz et al. | 260—453 |
| 3,450,653 | 6/1969 | McClellan | 260—18 |
| 3,455,836 | 7/1969 | Shultz et al. | 252—182 |
| 3,479,384 | 11/1969 | Heiss | 260—453 |

HOSEA E. TAYLOR, Primary Examiner

M. I. MARQUIS, Assistant Examiner

U.S. Cl. X.R.

117—161 KP; 252—182 R; 260—2.5 AT, 37 N, 75 NT, 77.5 AS, 453 A